Sept. 4, 1945. E. M. SHANTZ 2,383,945
VACUUM DISTILLATION PROCESS AND APPARATUS
Filed Sept. 26, 1942 2 Sheets-Sheet 1
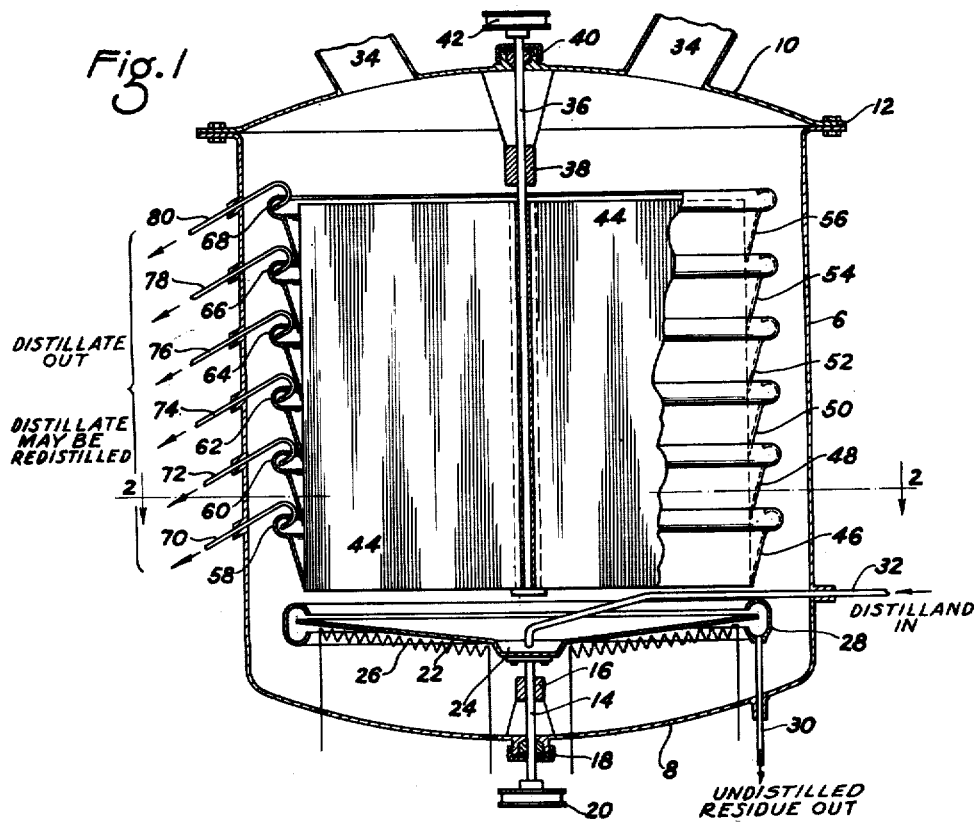
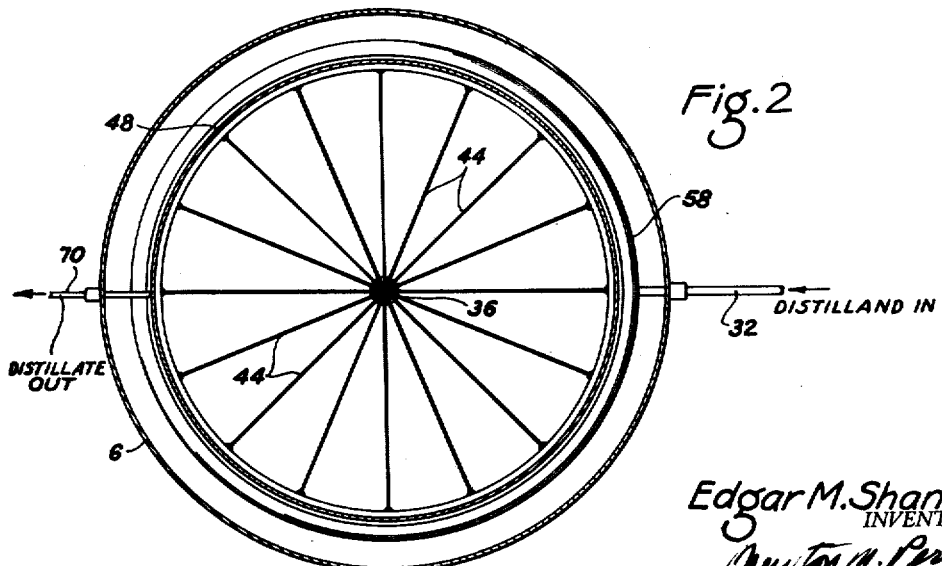
Edgar M. Shantz
INVENTOR
BY
ATTORNEYS

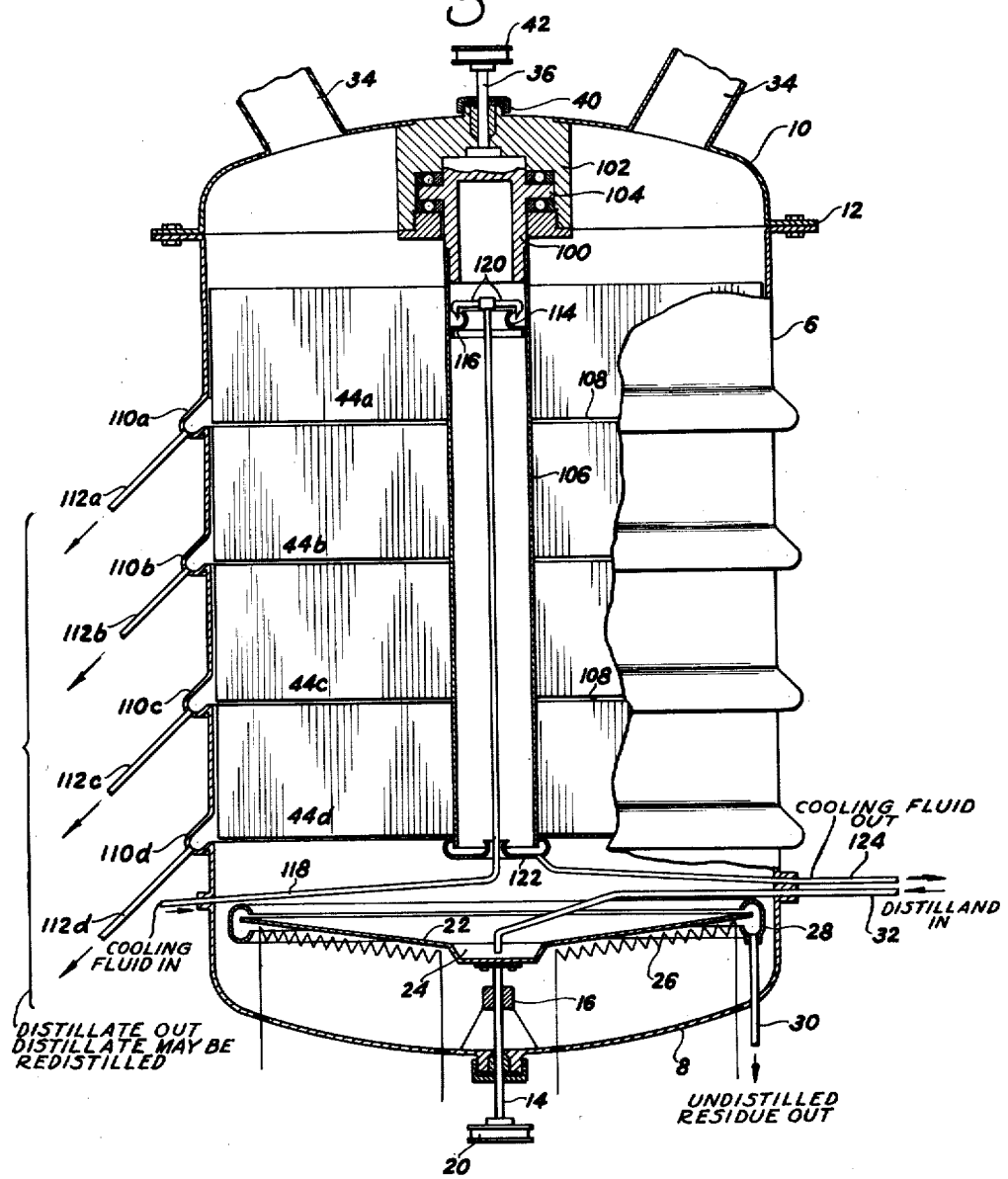

Patented Sept. 4, 1945

2,383,945

UNITED STATES PATENT OFFICE 2,383,945

VACUUM DISTILLATION PROCESS AND APPARATUS

Edgar M. Shantz, Rochester, N. Y., assignor to Distillation Products, Inc., Rochester, N. Y., a corporation of New Jersey Application September 26, 1942, Serial No. 459,794

7 Claims. (Cl. 202—52)

This invention relates to vacuum distillation process and apparatus, and in particular method and means for fractionating distilling vapors under high vacuum conditions.

Substances ordinarily distilled under vacuum, and particularly high vacuum distillation conditions, are quite easily decomposed by heat. Repeated distillations are necessary to fractionate under high vacuum conditions since it is impossible to effectively fractionate in a lagged column. Repeated heating of the distilland to distillation temperature in order to refractionate increases thermal decomposition. Even if lagged columns could be used for high vacuum distillation they would likewise be unsatisfactory because of increases thermal decomposition, the fractionating vapors being held at high temperature for a prolonged period of time in the lagging. For these reasons, fractionation as heretofore known has been far from satisfactory for fractionational distillation of low vapor pressure substances under high vacuum conditions.

This invention has for its object to provide improved high vacuum fractionational distillation procedure and apparatus for practicing such procedure. A still further object is to provide improved high vacuum unobstructed path distillation apparatus whereby the distilling vapors can be fractionated with one heating step. A further object is to provide high vacuum unobstructed path distillation process and apparatus whereby the distilling vapors are fractionated to separate their individual components without maintaining them in a heated condition substantially longer than normally required for high vacuum unobstructed path distillation. Other objects will appear hereinafter.

Under high vacuum unobstructed path distillation conditions the distilling vapors have an average velocity inversely proportional to the square root of their molecular weight; in other words, the low molecular weight vapors travel faster than those of higher molecular weight. I have found in accordance with my invention that this difference in velocity can be utilized to cause substantial separation of the vapors undergoing high vacuum distillation into their individual components. This is accomplished by condensing the vapors upon different condensing areas located at successively greater distances from the vapor source, said areas being adapted to separately condense vapor components according to their velocity and separately withdrawing the condensate from the different condensing areas. My invention includes apparatus for practicing such a process.

In the following description I have given several of the preferred embodiments of my invention, but it is to be understood that these are set forth for the purpose of illustration and not in limitation thereof.

In the accompanying drawings I have illustrated two of the preferred embodiments of my invention wherein like numbers refer to like parts, and wherein:

Fig. I illustrates an elevation partly in section of an improved fractionating still embodying the principles of my invention;

Fig. II is a horizontal section taken on lines 2—2 of Fig. I, and

Fig. III is a vertical section of a modification of the apparatus shown in Fig. I illustrating means for positively cooling the fractionating elements and modified means for collecting condensate therefrom.

Referring to Fig. I, numeral 6 designates a cylindrical still casing provided with an integral base 8 and a removable top 10 which is connected in a gas-tight manner to casing 6 by means of gas-tight gasket and flange 12. Numeral 14 designates a shaft mounted at the center of base plate 8 and housed in bearing 16 and packed gland 18. Numeral 20 designates a driving pulley fastened to the end of the shaft which is outside of the still casing, and numeral 22 designates a conical vaporizing surface which has a depressed central portion 24 which is rigidly mounted to the end of shaft 14. Numeral 26 designates an electrical heating element for heating conical plate 22 to distillation temperature. The periphery of plate 22 extends into an annular collar or gutter 28 to which is connected a withdrawal conduit 30. Numeral 32 designates a conduit through which distilland is introduced into the approximate center of depression 24.

Cover plate 10 is provided with two wide-aperture conduits 34 which connect to evacuating pumps (not shown). A shaft 36 passes through the approximate center of cover plate 10 and is housed in bearing 38 and packed gland 40. The end of shaft 36 protruding through plate 10 is provided with a driving pulley 42. Numerals 44 designates a plurality of radial vanes mounted upon shaft 36 in a rigid manner. A plurality of annular collars 46, 48, 50, 52, 54, and 56 are mounted upon the outside edges of vanes 44 at successively greater distances from the vaporizing plate 22. These annular collars are provided at their upper edges with gutters 58, 60, 62, 64, 66, and 68, respectively. Into these gutters protrude removable conduits 70, 72, 74, 76, 78 and 80 respectively.

Referring to Fig. III, numeral 100 designates a heavy hub rigidly housed in housing 102 and rotatably mounted upon bearing 104. Hub 100 is integral on one end with a tube or pipe 106, and at the center of the other end with driving shaft 36. Radial vanes are mounted upon tube or pipe 106 in much the same manner as illustrated in Figs. I and II. However, these radial vanes are separated into individual sections, 44a, b, c, and d. All of these sections rotate as one integral unit. However, there is a small space 108 between each segment or section. Gutters 110a, b, c and d, are formed in the wall of casing 6. These gutters are opposite the lowest portion of each of the rotating vane sections 44a—d, respectively. Numerals 112a, b, c, and d, designate withdrawal conduits connected to gutters 110a—d respectively.

An annular distributing collar 114 is mounted near the upper part and on the inside of tube 106. This collar is provided with perforations 116 near the periphery thereof. Numeral 118 indicates a conduit which terminates in a distributing T 120 which serves to introduce liquid into the distributing collar 114. The lower end of tube 106 protrudes into a stationary annular collar 122 to which is connected a withdrawal conduit 124.

In operating the apparatus illustrated in Figs. I and II the still is evacuated to a low pressure below .1 mm. and preferably below .01 mm. by means of evacuating pumps connected to conduits 34. Vaporizing plate 22 is caused to rotate by force applied to pulley 20 and is heated to distillation temperature by radiation from electrical heating elements 26 which are put into operation. The vanes 44 and their integral collars attached at the periphery are then caused to rotate preferably in the opposite direction as an integral unit by force applied to pulley 42. Liquid to be distilled is introduced through conduit 32. This liquid passes over the vaporizing surface 22 in the form of a thin film by centrifugal force. The vapors thus produced mostly pass upward in a direction at right angles to the vaporizing plate 22. The velocity of these vapors as indicated above depends upon their molecular weight; the higher molecular weight vapors passing at a slower speed than the lower molecular weight or lighter vapors. Vanes 44 cut across the path of these distilling vapors and the slower molecules will be struck by the vanes 44 before they have passed as great a distance as the lighter and faster molecules. Therefore, the slower and heavier molecules become condensed upon the lower portion of vanes 44 and are thrown by centrifugal force into gutter 58. The liquid accumulating in this gutter is forced by its rotational momentum into withdrawal conduit 70 through which it is removed from the still. The next lighter fraction is similarly thrown into gutter 50 and is withdrawn through conduit 72. Vapors having intermediate velocities are condensed upon intermediate areas of the vanes 44 and are collected in gutters 62, 64, 66, and withdrawn therefrom by conduits 74, 76, and 78 respectively. The lowest molecular weight portions of the vapor have the highest velocity and, therefore, are not contacted with the rotating vanes until they reach the upper portion thereof. Here they are struck by the vanes, become condensed thereon and are thrown by centrifugal force in the form of a liquid into gutter 68. This lightest fraction is removed through conduit 80.

In operating the apparatus illustrated in Fig. III the system is evacuated, vaporizing plate 22 is put into operation, and distilland is introduced through conduit 32 and removed through conduit 30 as described in connection with Fig. I. Power is applied to driving pulley 42 to cause shaft 36, hub 100 and tube 106 with integral radial vanes 44a—d to rotate as a single unit. It is preferred that pulley 42 be rotated in a direction counter to that in which pulley 20 is rotated. Distilling vapors derived from vaporizing plate 22 pass upwardly with a velocity more or less inversely proportional to their molecular weights. The highest molecular weight vapors, and consequently the slowest vapors, become condensed upon vanes 44d. The condensate is thrown by centrifugal force against the wall of the casing 6 between gutters 110c and 110d. This liquid flows by gravity into gutter 110d and is removed through conduit 112d. The intermediate vapors, i. e., those having intermediate molecular weight, travel farther than the highest molecular material, consequently the intermediate vapors are condensed upon sections 44c and 44b and are withdrawn through conduits 112a and 112b. The lightest fraction travels the greatest distance and, therefore, is condensed upon section 44a of the radial vanes and is thrown into gutter 110a and removed through conduit 112a. The space 108 between each of the sections of the radial vanes prevents intermixture of the fractions condensed on the different sections.

Cooling of the radial vanes is not always necessary but it is usually advantageous and is necessary in some cases. Positive cooling of the vanes takes place in Fig. III by introduction of cold low vapor pressure liquid through conduit 118. This liquid is distributed through distributor 120 into collar 114 from which it flows through openings 116 onto the inside wall of tube 106. The cold liquid is evenly distributed on the wall of tube 106 in the form of a thin film by centrifugal force. Since tube 106 and the radial vanes are of metal the vanes are effectively cooled by conduction. This film of cooling liquid travels downward by gravity and is thrown into gutter 122 either by gravity or centrifugal force. The liquid is then withdrawn from gutter 122 by way of conduit 124. The liquid used for cooling purposes should have a low vapor pressure at its highest temperature of utilization so that it will not vaporize and become mixed with the material being distilled. The vapor pressure, of course, depends upon the temperature and if the liquid is not permitted to rise to above room temperature while it is in the still, substantially higher vapor pressure cooling liquids can be used than if the liquid is heated to a rather high temperature while in the still. A preferred liquid for this purpose is the undistilled residue obtained by distillation under molecular conditions. Thus, when distilling vegetable and animal oils such as linseed, cod liver, pollack, gray fish, etc., oils in order to obtain vitamin or glyceride fractions, an undistilled residue having a very low vapor pressure is obtained. This material can be efficiently used as a cooling liquid.

Example

Fish liver oils are distilled in a centrifugal molecular still to concentrate the vitamin A ester by passing the oil over the evaporating surface at about 200° C. and .001 mm. Hg. Assuming the vitamin A ester to have an average molecular weight of 550 and the contaminating substances to have molecular weights ranging from 300 to 800, the following mean molecular velocities are calculated from the formula $\frac{1}{3} Mu^2 = RT$ where M is the molecular weight, $u$ the mean velocity in cm./sec., R is the gas constant in ergs/mol-°K., and T is the absolute temperature:

Substance with mol. wt. = 300
Vitamin A ester (mol. wt.) = 550
Substances with mol. wt. = 800
$u = 19.8 \times 10^3$ cm./sec.
$u = 14.6 \times 10^3$ cm./sec.
$u = 12.1 \times 10^3$ cm./sec.

Thus, if the centrifugal molecular still revolving at 6,000 R. P. M. has as a condensing surface 8 radial vanes revolving at 6,000 R. P. M. in the opposite direction, the relative speed of the vanes to the plate is 12,000 R. P. M. or 200 R. P. S. ⅛ of a revolution would, therefore, require ¹⁄₁₆₀₀ second. If the length of the vanes were about 20 cm., it can be seen that even the fastest molecules would be captured before traversing this distance, and there should be graduation of the condensate along the vanes, with that of highest mole-weight nearest the evaporating surface.

While I have illustrated my invention as being applicable to rotating, vaporizing and condensing surfaces, it is unnecessary to employ both at the same time. Thus, it is perfectly feasible to employ a vaporizing surface over which the distilland is caused to flow by gravity. On the other hand, stationary vanes can be used when a centrifugal vaporizing surface is employed. This is because the vapors have imparted to them a centrifugal component by the rotating vaporizing surface. This will cause the distilling vapors to impinge upon the stationary fractionating vanes in the same way as if the vaporizing surface were stationary and the fractionating vanes rotating. The centrifugal motion thus imparted to the distilling vapors does not cause them to impinge upon the stationary vanes to as high a degree as when the vanes rotate, but it is sufficient to enable fractionation. It is, therefore, desirable to employ vanes of larger dimensions in the direction of travel of the distilling vapors if a rotating fractionating element is not employed.

According to the preferred embodiments of my invention as illustrated, both the fractionating vanes and the vaporizing surface rotate in opposite directions. The angular velocity or centrifugal component imparted to the distilling vapors by the centrifugal vaporizing surface causes them to pass in a direction toward the fractionating vanes 44. Therefore, the vanes will impinge upon the vapors more quickly. This will enable slower speeds of rotation for the fractionating vanes or smaller dimensions in the direction in which the vapors travel.

The speed of rotation of the vanes should be such that the fast molecules of the vapors are intercepted by the vanes before traversing their full length. The greater the number of vanes the slower may be the speed of rotation. For example, if N vanes are revolving about an axis of length I the vanes should rotate 360° divided by N in the time that it takes the fastest molecule to travel the distance I. It is preferred that the evaporating surface and the condensing vanes rotate in opposite directions and at as great a speed as practicable.

While I prefer to utilize flat, rectangular, radial vanes it is obvious that other shapes can be used without departing from the spirit or scope of my invention; thus, the vanes instead of being flat may have the shape of an arc. Also, they may be triangular, oval or twisted so long as their largest area is efficiently presented to the distilling vapors as the vane cuts across their path. While such shapes and modifications would be more expensive to manufacture, and in some cases would be less efficient, they can be utilized to obtain useful fractionation in accordance with my invention. Repeated application of my improved process to a fraction will enable very close segregation of a single component. This is accomplished by first separating a fraction as described and again subjecting it to refractionation in the same apparatus or in another still embodying the fractionating features described. Any number of such stills may be connected in succession to enable continuous refractionation in this manner.

What I claim is:

1. The process of high vacuum unobstructed path distillation which comprises in combination vaporizing distilland by flowing it over a vaporizing surface; separately condensing these vapors according to their velocity upon a plurality of rotating condensing vanes which are positioned at successively greater distances from the vaporizing surface, which are separated from the vaporizing surface by substantially unobstructed space and which are rotated in a direction approximately at right angles to the direction of flow of a substantial portion of the vapors and at such a speed that the heavier vapors are caused to impinge and condense upon the vanes nearest the vaporizing surface and the lighter vapors upon the vanes farthest from the vaporizing surface and separately withdrawing condensate from the different vanes.

2. The process of high vacuum unobstructed path distillation which comprises in combination vaporizing distilland by flowing it over a vaporizing surface, separately condensing these vapors according to their velocity upon a plurality of sets of rotating condensing vanes which are positioned at successively greater distances from the vaporizing surface, which are separated from the vaporizing surface by substantially unobstructed space and which are rotated in a direction approximately at right angles to the direction of flow of a substantial portion of the vapors and at such a speed that the heavier vapors are caused to impinge and condense upon the set of vanes nearest the vaporizing surface and the lighter vapors upon the set of vanes farthest from the vaporizing surface, separately withdrawing condensed fractions from the different sets of vanes and subjecting at least one of these fractions to the same distillation.

3. The process of high vacuum unobstructed path distillation which comprises in combination vaporizing distilland by causing it to flow by centrifugal force in a thin film over a heated rotating vaporizing surface, separating the condensing vapors according to their velocity upon a plurality of sets of rotating condensing vanes which are positioned at successively greater distances from the vaporizing surface, which are separated from the vaporizing surface by substantially unobstructed space and which are rotated in a direction such that they cut across the path of the distilling vapors and cause them to impinge on the larger surfaces of the vanes and separately withdrawing condensate from the different sets of vanes.

4. Vacuum unobstructed path distillation apparatus for fractionating vapors by selective condensation according to their velocity comprising in combination a vaporizing surface, means for heating the vaporizing surface, means for introducing distilland onto the vaporizing surface, means for removing undistilled residue from the vaporizing surface, a plurality of condensing vanes which are positioned opposite to the vaporizing surface and separated therefrom by substantially unobstructed space, which condensing vanes are adapted to rotate so that the vanes cut or pass across the path of the distilling vapors and cause the vapors to impinge upon the largest surfaces thereof, and means for collecting separate fractions from different areas of each of the vanes whereby during operation distilling vapors are selectively condensed and separated according to their velocities.

5. Vacuum distillation apparatus comprising in combination a vaporizing surface, means for heating the vaporizing surface, means for introducing distilland onto the vaporizing surface, means for removing undistilled residue from the vaporizing surface, a plurality of sets of approximately co-axial condensing vanes which are positioned opposite to the vaporizing surface and separated therefrom by substantially unobstructed space, which sets of vanes are in series with respect to the path of vapor and which are adapted to rotate in such a manner that the vanes of each set cut or pass across the path of the distilling vapors and cause the vapors to impinge upon the largest surfaces thereof, and means for separately collecting condensate from each set of vanes in the series whereby during operation distilling vapors are selectively condensed and separated according to their velocities.

6. Vacuum distillation apparatus comprising in combination a vaporizing surface, means for heating the vaporizing surface, means for introducing the distilland onto the vaporizing surface, means for removing undistilled residue from the vaporizing surface, a plurality of sets of approximately co-axial condensing vanes each of the sets of vanes being mounted in series with respect to the path of vapor upon a rotatable shaft positioned parallel with the direction of flow of vapors from the vaporizing surface and positioned in the center of areas which the distilling vapors occupy during distillation, each vane of each set being mounted upon the shaft in such a manner as to cause liquid thereon to be thrown by centrifugal force in a direction at right angles to the shaft and means for separately collecting liquid centrifugally thrown from each set of vanes in the series whereby during operation distilling vapors are selectively condensed and separated according to their velocities.

7. Vacuum distillation apparatus comprising in combination a rotatable vaporizing surface which is adapted during operation to distribute distilland in a thin film by centrifugal force, means for heating the vaporizing surface, means for introducing the distilland onto the vaporizing surface, means for removing undistilled residue from the vaporizing surface, a plurality of sets of approximately co-axial condensing vanes which are mounted upon a rotatable shaft positioned parallel with the direction of flow of vapors from the vaporizing surface to the condensing surface, said sets of vanes being mounted upon the shaft in series with respect to the path of the vapor so that during rotation of the shaft the largest surface of the vanes collides with distilling vapors and means for separately collecting liquid fractions from each set of vanes in the series whereby during operation distilling vapors are selectively condensed and separated according to their velocities.

EDGAR M. SHANTZ.

CERTIFICATE OF CORRECTION.

Patent No. 2,383,945. September 4, 1945.

EDGAR M. SHANTZ.

It is hereby certified that error appears in the above numbered patent requiring correction as follows: In the grant, line 3, and in the heading to the printed specification, line 6, state of incorporation, for "New Jersey" read --Delaware--; page 1, second column, line 48, for the word "Numerals" read --Numeral--; and that the said Letters Patent should be read with this correction therein that the same may conform to the record of the case in the Patent Office.

Signed and sealed this 11th day of December, A. D. 1945.

Leslie Frazer (Seal) First Assistant Commissioner of Patents.

separated from the vaporizing surface by substantially unobstructed space and which are rotated in a direction such that they cut across the path of the distilling vapors and cause them to impinge on the larger surfaces of the vanes and separately withdrawing condensate from the different sets of vanes.

4. Vacuum unobstructed path distillation apparatus for fractionating vapors by selective condensation according to their velocity comprising in combination a vaporizing surface, means for heating the vaporizing surface, means for introducing distilland onto the vaporizing surface, means for removing undistilled residue from the vaporizing surface, a plurality of condensing vanes which are positioned opposite to the vaporizing surface and separated therefrom by substantially unobstructed space, which condensing vanes are adapted to rotate so that the vanes cut or pass across the path of the distilling vapors and cause the vapors to impinge upon the largest surfaces thereof, and means for collecting separate fractions from different areas of each of the vanes whereby during operation distilling vapors are selectively condensed and separated according to their velocities.

5. Vacuum distillation apparatus comprising in combination a vaporizing surface, means for heating the vaporizing surface, means for introducing distilland onto the vaporizing surface, means for removing undistilled residue from the vaporizing surface, a plurality of sets of approximately co-axial condensing vanes which are positioned opposite to the vaporizing surface and separated therefrom by substantially unobstructed space, which sets of vanes are in series with respect to the path of vapor and which are adapted to rotate in such a manner that the vanes of each set cut or pass across the path of the distilling vapors and cause the vapors to impinge upon the largest surfaces thereof, and means for separately collecting condensate from each set of vanes in the series whereby during operation distilling vapors are selectively condensed and separated according to their velocities.

6. Vacuum distillation apparatus comprising in combination a vaporizing surface, means for heating the vaporizing surface, means for introducing the distilland onto the vaporizing surface, means for removing undistilled residue from the vaporizing surface, a plurality of sets of approximately co-axial condensing vanes each of the sets of vanes being mounted in series with respect to the path of vapor upon a rotatable shaft positioned parallel with the direction of flow of vapors from the vaporizing surface and positioned in the center of areas which the distilling vapors occupy during distillation, each vane of each set being mounted upon the shaft in such a manner as to cause liquid thereon to be thrown by centrifugal force in a direction at right angles to the shaft and means for separately collecting liquid centrifugally thrown from each set of vanes in the series whereby during operation distilling vapors are selectively condensed and separated according to their velocities.

7. Vacuum distillation apparatus comprising in combination a rotatable vaporizing surface which is adapted during operation to distribute distilland in a thin film by centrifugal force, means for heating the vaporizing surface, means for introducing the distilland onto the vaporizing surface, means for removing undistilled residue from the vaporizing surface, a plurality of sets of approximately co-axial condensing vanes which are mounted upon a rotatable shaft positioned parallel with the direction of flow of vapors from the vaporizing surface to the condensing surface, said sets of vanes being mounted upon the shaft in series with respect to the path of the vapor so that during rotation of the shaft the largest surface of the vanes collides with distilling vapors and means for separately collecting liquid fractions from each set of vanes in the series whereby during operation distilling vapors are selectively condensed and separated according to their velocities.

EDGAR M. SHANTZ.

CERTIFICATE OF CORRECTION.

Patent No. 2,383,945. September 4, 1945.

EDGAR M. SHANTZ.

It is hereby certified that error appears in the above numbered patent requiring correction as follows: In the grant, line 3, and in the heading to the printed specification, line 6, state of incorporation, for "New Jersey" read --Delaware--; page 1, second column, line 48, for the word "Numerals" read --Numeral--; and that the said Letters Patent should be read with this correction therein that the same may conform to the record of the case in the Patent Office.

Signed and sealed this 11th day of December, A. D. 1945.

Leslie Frazer (Seal) First Assistant Commissioner of Patents.